(12) United States Patent
Beyer et al.

(10) Patent No.: US 6,535,809 B1
(45) Date of Patent: Mar. 18, 2003

(54) VEHICLE ENGINE TORQUE CONTROL WITH ENGINE DRAG CONTROL MODE

(75) Inventors: Keith Wayne Beyer, Novi, MI (US); Eric Edward Krueger, Ann Arbor, MI (US); Vincent E Marchese, White Lake, MI (US); Todd David Brown, Brooklyn, MI (US); Alan Rae Lustre, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 65 days.

(21) Appl. No.: 09/708,867

(22) Filed: Nov. 8, 2000

(51) Int. Cl.[7] .............................................. B60K 28/16
(52) U.S. Cl. .................................... 701/84; 180/197
(58) Field of Search ............................. 701/82, 84, 85, 701/90; 180/197

(56) References Cited

U.S. PATENT DOCUMENTS

| | | | |
|---|---|---|---|
| 3,802,528 A | 4/1974 | Leiber | 180/197 |
| 4,917,208 A | 4/1990 | Komoda | 180/197 |
| 5,024,285 A * | 6/1991 | Fujita | 180/197 |
| 5,245,542 A * | 9/1993 | Itoh et al. | 180/197 |
| 5,255,192 A * | 10/1993 | Ito et al. | 701/90 |
| 5,328,255 A | 7/1994 | Isella | 180/197 |
| 5,492,192 A | 2/1996 | Brooks et al. | 180/197 |
| 5,867,803 A * | 2/1999 | Kim et al. | 701/85 |
| 5,957,991 A * | 9/1999 | Yasuda | 701/84 |
| 6,023,650 A * | 2/2000 | Yamamoto et al. | 701/84 |
| 6,240,355 B1 * | 5/2001 | Schmitt | 701/84 |

* cited by examiner

Primary Examiner—Gary Chin
(74) Attorney, Agent, or Firm—Robert M. Sigler

(57) ABSTRACT

A vehicle powertrain torque control provides an engine drag control mode of operation during periods of undesired engine drag induced wheel slip by modifying the torque of the vehicle engine in closed loop control to maintain a driven wheel speed at a predetermined target velocity lower than the vehicle speed by a target velocity difference providing as much engine braking as is consistent with a desired degree of lateral traction. The control derives a velocity error as the difference between the driven wheel speed and the target velocity and derives and delivers to the powertrain a torque command for reducing the velocity error. The torque control determines the engine drag control mode in response to the wheel speed sensors, preferably causing entry of the engine drag control mode when the driven wheel speed that is closest to the vehicle speed falls below the target velocity while powertrain delivered torque and throttle position are below predetermined values indicative of deceleration. The target velocity difference is preferably determined as a weighted difference between vehicle speed and vehicle turn curvature, the difference being reduced by the latter for quicker response in vehicle turns.

9 Claims, 3 Drawing Sheets

VEHICLE ENGINE TORQUE CONTROL WITH ENGINE DRAG CONTROL MODE

TECHNICAL FIELD

The technical field of this invention is powertrain torque control for a motor vehicle.

BACKGROUND OF THE INVENTION

When a driven wheel of a vehicle slips with respect to the road surface, either by slowing down or speeding up, lateral adhesion of the tire to the road can decrease quickly and significantly. Loss of lateral adhesion can allow the tire to slip sideways and thus cause understeer (if a front wheel) or oversteer (if a rear wheel). Wheel slip is controlled in many vehicles by traction control systems during powertrain produced acceleration and by anti-lock braking controls during application of the vehicle brakes. But such slip may sometimes be produced by engine braking during vehicle deceleration when the throttle is closed with no vehicle brakes applied, when the engine slows down faster than the vehicle body and causes a braking torque to be applied to the driven wheels. Anti-lock braking controls are of no use when the vehicle brakes are not applied; and most acceleration traction controls are generally not designed to deal with wheel slip due to engine braking.

One system for sensing a difference in wheel speeds between driven and undriven wheels due to engine braking and increasing fuel to provide increased engine torque and spin up the slipping wheel has been suggested in U.S. Pat. No. 3,802,528; but modern computerized powertrain controls permit a far more finely tuned and accurate closed loop control to more advantageously balance the opposing goals of controlling wheel slip and providing engine braking.

SUMMARY OF THE INVENTION

The powertrain torque control of this invention provides an engine drag control mode of operation during periods of undesired engine drag induced wheel slip by modifying the torque of the vehicle engine in closed loop control to maintain a driven wheel speed at a predetermined target velocity lower than the vehicle speed by a target velocity difference providing as much engine braking as is consistent with a desired degree of lateral traction. The control derives a velocity error as the difference between the driven wheel speed and the target velocity and derives and delivers to the powertrain a torque command for reducing the velocity error.

The torque control determines the engine drag control mode in response to the wheel speed sensors, preferably causing entry of the engine drag control mode when the driven wheel speed that is closest to the vehicle speed falls below the target velocity while powertrain delivered torque and throttle position are below predetermined values indicative of deceleration. The driven wheel speed closest to the vehicle speed is preferably chosen because only one driven wheel is necessary for lateral traction and this wheel requires the smallest reduction in engine braking. The target velocity difference is preferably determined as a weighted difference between vehicle speed and vehicle turn curvature, the difference being reduced by the latter for quicker response in vehicle turns.

DESCRIPTION OF THE PREFERRED EMBODIMENT

Figure 1:
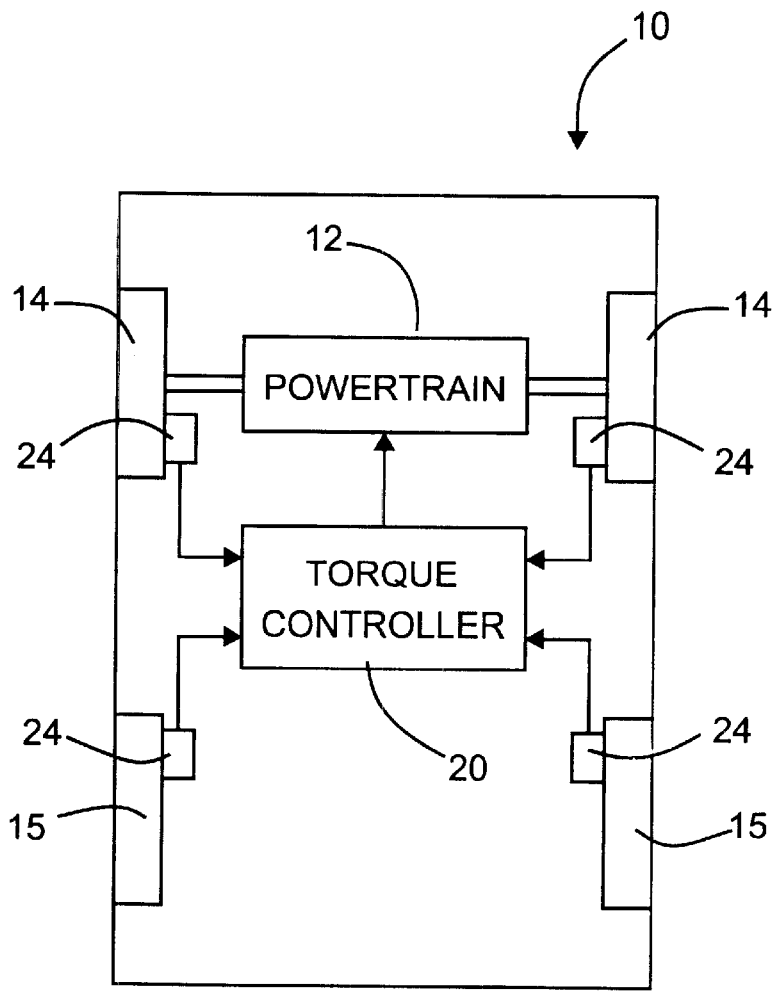
FIG. 1 is a schematic block diagram of a vehicle with a powertrain torque control system according to the invention.

FIG. 1 shows a schematic block diagram of a motor vehicle 10 with a powertrain 12 including an engine to provide torque to driven wheels and thus propel the vehicle. In this embodiment, powertrain 12 includes a combustion engine driving a pair of driven wheels 14 located at the front of the vehicle through a standard transmission and transaxle apparatus; but the invention is not limited to such an arrangement. Powertrain 12 may include any appropriate prime mover, whether powered by combustion, electric energy or another energy conversion process; and it may drive wheels at the rear of the vehicle. Vehicle 10 is also provided with a pair of undriven wheels which, at least at times, do not receive torque from powertrain 12. In this embodiment, a pair of undriven wheels 15 are mounted at the rear of vehicle 10.

Powertrain 12 is provided with a torque controller 20 having a throttle input device, not shown, that enables a vehicle operator to signal a desired amount of driving power or torque. Movement of this throttle input device in a direction to increase power tends to produce an increase in torque to the driven wheels 14 that accelerates the vehicle through the tire interaction with a road surface. Likewise, movement of this throttle input device in the opposite direction tends to produce a decrease in torque to the driven wheels 12 that allows deceleration of vehicle 10 (coast-down). Torque controller 20 preferably includes a digital computer for determining and delivering the torque command signal to powertrain 12 in response to the throttle input device and other sensors. The computer runs a permanently stored program for processing inputs from sensors and command inputs in a control algorithm that may be conventional except as described herein.

Vehicle 10 is provided with a wheel speed sensor 24 at each of the driven wheels 14 and undriven wheels 15. The output wheel speed signals from sensors 24 are provided to torque controller 20 for use in the apparatus of this invention. In many vehicles, these wheel speed sensors are integrated into wheel bearing apparatus and perhaps into brake or full corner modules. Their primary use in the prior art has been to provide signals for sensing wheel slip in anti-lock brake and/or acceleration traction control systems. Their wide use in vehicles and the nature of the information obtainable from them renders them preferred sensors for the apparatus of this invention, although some of the signals may be provided by alternative sensors as desired by the designer of vehicle 10 for convenience or cost reasons. In some vehicles, sensors 24 will provide their signals, which are generally in the form of a pulse train having a pulse rate proportional to wheel speed, directly to a brake or other controller for processing into digital numerical data that can be used in a computer algorithm; and the choice of which controller performs this function and how the controllers communicate data with each other is a matter for the designer of the vehicle 10 and not limiting to this invention.

Figure 3A:
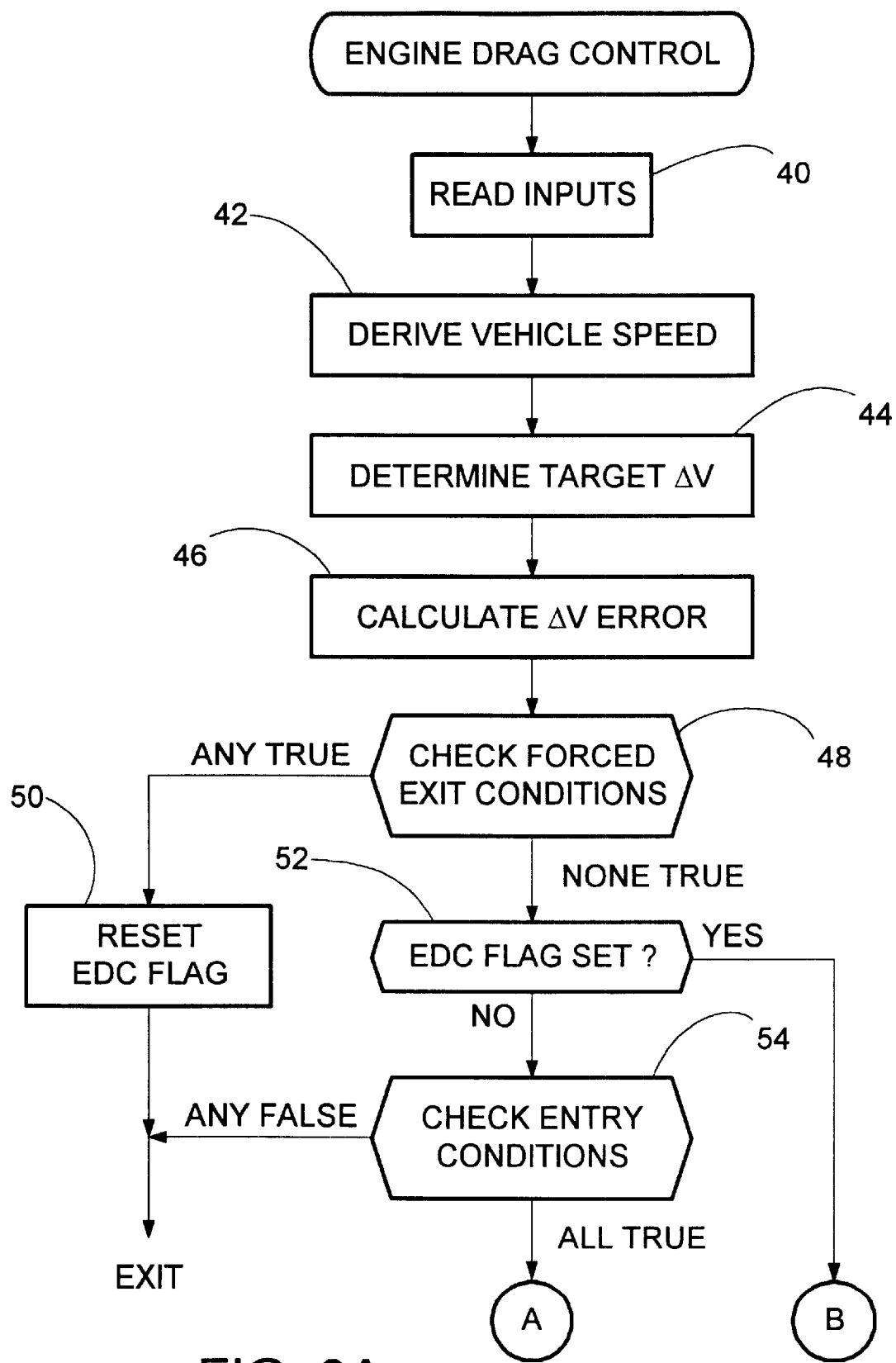
FIGS. 3A and 3B show a flow chart illustrating the operation of the powertrain torque control of FIG. 1.
Figure 3B:
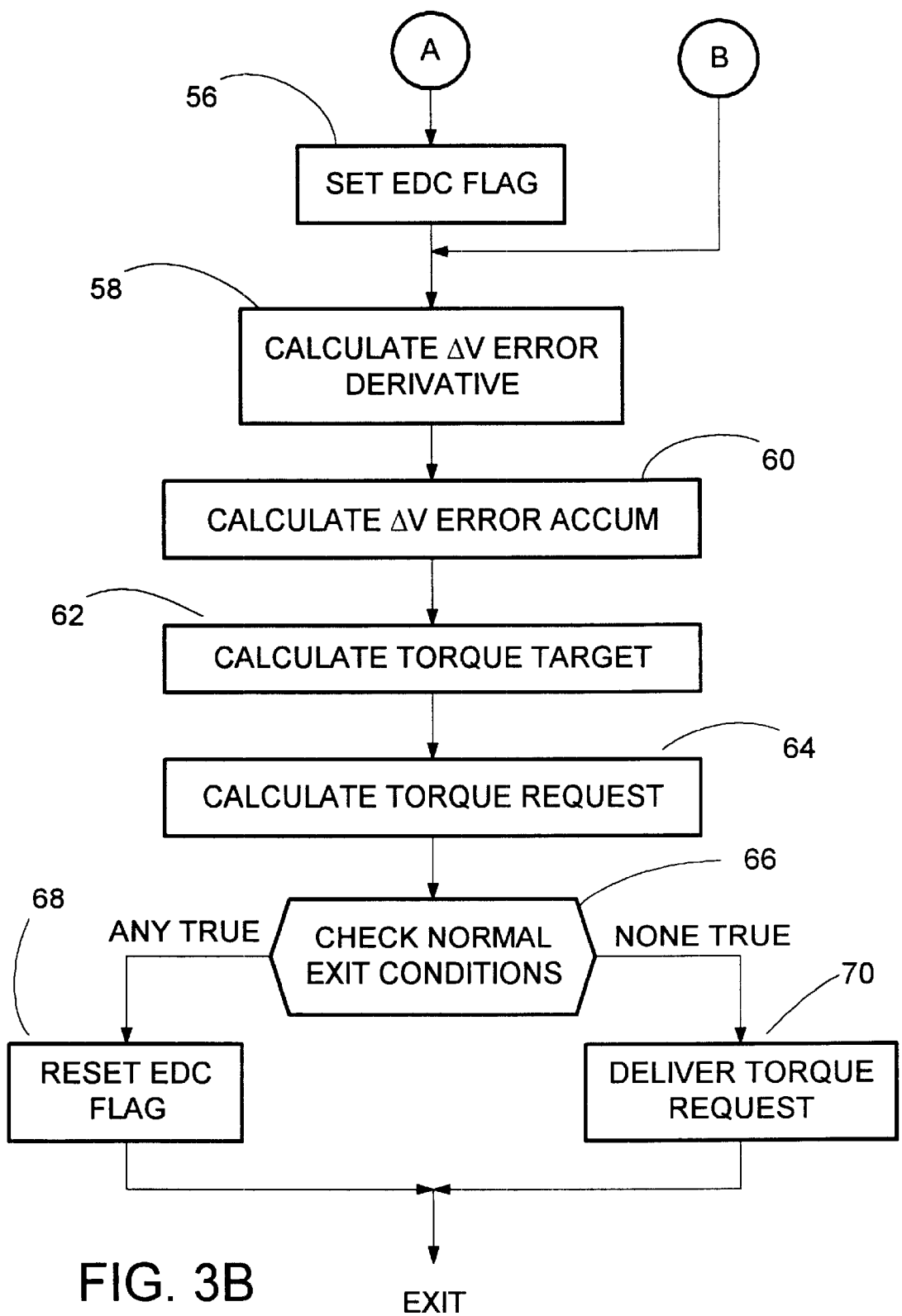

The operation of torque controller 20 relevant to this invention is described with respect to the flow chart of FIGS. 3A–B. This flow chart is described as a subroutine to be called from an overall powertrain torque control in torque controller 20, but it could be set up in a number of alternate ways, depending on the specific vehicle apparatus. The flow chart includes a recitation of several steps that might actually be performed in a different part of the program.

Referring to FIG. 3A, the subroutine ENGINE DRAG CONTROL begins at step 40 by reading a plurality of inputs necessary for the remainder of its operation. These inputs preferably include signals from wheel speed sensors 24 associated with driven wheels 14 and undriven wheels 15 or numerical values of these speeds from another system that processes the wheel speed signals. The step includes performing such processing, such as filtering or conversion of a pulse train to a numerical value indicative of pulse repetition rate, as is required to render the signals fit for use in the algorithm of the subroutine. The subroutine next derives a vehicle speed signal VEHICLE SPEED at step 42 from the wheel speeds of the undriven wheels, typically averaging them to compensate for wheel speed differences in vehicle turns.

The subroutine next determines a TARGET $\Delta V$ at step 44. This is the desired amount by which the driven wheel speed is to be lower than the vehicle speed during deceleration with engine braking, as explained with reference to the plot of FIG. 2.

Figure 2:
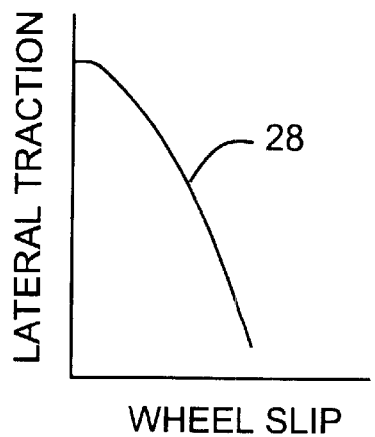
FIG. 2 shows a plot of lateral traction for a tire of a driving wheel on a motor vehicle.

Referring to FIG. 2, the variation of lateral traction of a tire is plotted in curve 28 as a function of wheel slip. The lateral traction of the tire decreases rapidly with increasing slip, but a limited amount of loss of lateral traction can be tolerated. TARGET $\Delta V$ is directly related to the amount of wheel slip that will allow the most engine braking consistent with a minimum allowed lateral traction. The system is operated in closed loop control, as will be further described, to maintain that operating point during deceleration with engine braking.

Referring again to FIG. 3A, the subroutine determines TARGET $\Delta V$ at step 44 as the weighted difference of vehicle speed and a vehicle turn curvature:

TARGET $\Delta V=G_1$*(VEHICLE SPEED)$-G_2$*(TURN CURVATURE), wherein TURN CURVATURE represents the degree of turning of the vehicle, as indicated by a steering angle sensor or a difference in wheel speed between right and left undriven wheel speeds and $G_1$ and $G_2$ are calibrated weighting gains. The positive (vehicle speed) term in the equation is directly related to a desired wheel slip and the negative (vehicle turn curvature) term reduces the velocity difference to adjust the balance in favor of traction rather than engine braking in vehicle turns, where lateral traction is more important. The value of TARGET $\Delta V$ calculated in step 44 is also limited to minimum and maximum values calibrated for a vehicle.

At step 46, a value $\Delta V$ ERROR is calculated. This value is the difference between the actual driven wheel speed and a TARGET VELOCITY that is itself lower than the VEHICLE SPEED by the TARGET $\Delta V$. Thus, in two steps, for example:

TARGET VELOCITY=VEHICLE SPEED$-$TARGET $\Delta V$;

$\Delta V$ ERROR=DRIVEN WHEEL SPEED$-$TARGET VELOCITY.

The value of $\Delta V$ ERROR is thus the driven wheel speed error in engine drag control; and it is zero when DRIVEN WHEEL SPEED equals TARGET VELOCITY. Preferably, when values of $\Delta V$ ERROR have been calculated for both driven wheels, the best case value is chosen for maximum retained engine braking, since lateral traction will be sufficient with a single wheel. In the equations above, the highest signed value of $\Delta V$ ERROR would be chosen, since that wheel has the speed closest to the VEHICLE SPEED and thus the better traction. But although preferred, this choice is not required. The lowest value could be chosen to try to ensure that both wheels have lateral traction, or an average of the values, or some other combination.

The program next checks a plurality of FORCED EXIT conditions at step 48. If any of these conditions is true, then an EDC flag will be reset at step 50 and the subroutine will be exited. A preferred set of these conditions are listed as follows:

(1) Anti-lock braking (ABS) is active on either of the undriven wheels 13.

(2) A brake switch or other signal from a vehicle braking system indicates an operator braking request.

(3) Vehicle speed is less than a calibrated value below which engine braking has little effect and is therefore of little concern.

(4) A diagnostic fault is determined.

(5) A vehicle park brake is activated.

(6) Vehicle powertrain 12 is in a reverse, neutral or park mode.

(7) If there is a vehicle yaw stability control or indicator, it shows the vehicle in a spin.

(8) If powertrain 12 has a manual transmission, an indication of a disengaged clutch, which can allow engine racing. This could be a signal from a clutch switch or an abnormally high ratio of engine RPM to the average of the driven wheel speeds.

None of these conditions is considered absolutely essential for the operation of this invention as claimed. But any system actually used on a vehicle will preferably have some such forced exit conditions; and this particular set of such conditions is described for this preferred embodiment at the time of this writing. Any one of these FORCED EXIT conditions will prevent or stop the operation of the engine drag control, effective immediately.

If none of the FORCED EXIT conditions is true at step 48, the subroutine proceeds to check the EDC flag in step 52. If the flag is not set, the subroutine checks at step 54 a plurality of entry conditions, all of which must be simultaneously true. A preferred set of these conditions are listed as follows:

(1) $\Delta V$ ERROR is less than a calibrated value. This is the main wheel speed error condition to be minimized by the closed loop control as described above. Typically, the calibrated value is zero, which indicates that the driven wheel speed is falling below the TARGET VELOCITY.

(2) Throttle position is less than a calibrated value, which indicates a vehicle deceleration condition and prevents engine drag control from being activated simultaneously with acceleration traction control. Throttle position is typically sensed by a throttle position sensor that is part of powertrain controller 20.

(3) Delivered torque is less than a calibrated value, which is also indicative of vehicle deceleration. The delivered torque is the torque actually provided by powertrain 12 to vehicle 10, as sensed or estimated by powertrain controller 20.

(4) Any brake controlling vehicle yaw stability system must be inactive.

(5) Wheel speed information must be considered valid. This means that any algorithm that detects and/or compensates for a (smaller diameter) spare tire on a wheel, for instance, must indicate that the wheel speed indicated by the sensor 24 on that wheel is properly compensated and thus believable.

If any of the entry conditions of step 54 is false, the subroutine is exited with the EDC still reset. But if all the entry conditions are met at step 54, the EDC flag is set at step 56 as shown in FIG. 3B; and from step 56, or from step 52 if the EDC flag was already found to be set, the subroutine proceeds to step 58.

At step 58, a $\Delta V$ ERROR DERIVATIVE value is calculated. This is the time derivative of $\Delta V$ ERROR and is typically derived in a digital system as the difference between the present and previous values of $\Delta V$ ERROR:

$$\Delta V \text{ ERROR DERIVATIVE} = (\Delta V \text{ ERROR}_N - \Delta V \text{ ERROR}_{N-1})/\text{STEP},$$

wherein subscripts N and N−1 refer to the present and previous values of $\Delta V$ ERROR and STEP is the time step, for example, the loop time.

At step 60, an integrated value $\Delta V$ ERRORACCUM is calculated. One way of doing this in a digital system is to accumulate successive values of $\Delta V$ ERROR:

$$\Delta V \text{ ERROR ACCUM}_N = \Delta V \text{ ERROR ACCUM}_{N-1} + \Delta V \text{ ERROR}_N.$$

But the value of $\Delta V$ ERROR ACCUM is reset to zero when:

$$G_3^*(\Delta V \text{ ERROR}) + G_4^*(\Delta V \text{ ERROR DERIVATIVE}) > CAL_1,$$

wherein $G_3$, $G_4$ and $CAL_1$ are calibrated constants.

At step 62, a TORQUE TARGET value is calculated by setting it equal to a calibrated initial value when the engine drag control mode is entered and decreasing it by a small value in each loop thereafter until the engine drag control mode is exited:

$$\text{TORQUE TARGET} = \text{INITIAL TORQUE TARGET} - CAL_2^* \text{COUNT},$$

wherein INITIAL TORQUE TARGET is the calibrated initial value, $CAL_2$ is a calibrated value and COUNT is a count value initialized at zero in the first loop of the EDC mode and incremented in each successive loop during engine drag control.

At step 64 TORQUE REQUEST is calculated in a PID control loop:

$$\text{TORQUE REQUEST} = \text{TORQUE TARGET} - (G_5^* \Delta V \text{ ERROR} + G_6^* \Delta V \text{ ERROR DERIVATIVE} + G_7^* \Delta V \text{ ERROR ACCUM}).$$

The value of TORQUE REQUEST as calculated above is limited between a maximum (positive) calibrated value and a minimum (negative) calibrated value. The maximum value may be a function of vehicle acceleration, which may be derived from the derivative of vehicle speed.

At step 66 a set of normal exit conditions is checked. The normal exit conditions are as follows:

(1) $\Delta V$ ERROR exceeds a calibrated value for a calibrated time. The calibrated value of $\Delta V$ ERROR for exit is set somewhat higher than the calibrated value for entry to provide hysteresis. If the calibrated value for entry is zero, as provided above as an example, then the calibrated value for exit could equal to a small positive value.

(2) DELIVERED TORQUE exceeds TORQUE REQUEST plus a calibrated value for a calibrated time. The calibrated value in this condition is also for hysteresis.

(3) DELIVERED TORQUE exceeds a calibrated value for a calibrated time. This calibrated value may also be made somewhat higher than the calibrated value for the entry condition for hysteresis.

The calibrated times for which the normal exit conditions must be true may be determined by use of a standard software counter that is incremented when the condition is true and reset to zero when the condition is not true; with the calibrated time represented by a stored reference count. It should be noted that the calibrated times of the subroutine may be the same but are not necessarily so.

If any of the normal exit conditions is found to be true at step 66, the EDC flag is reset at step 68 and the subroutine is exited. But if none of the normal exit conditions is found to be true at step 66, the subroutine proceeds to step 70, in which the value of TORQUE REQUEST is delivered or stored for use in controlling powertrain 12.

What is claimed is:

1. A torque control for a vehicle having a powertrain driving at least one driven wheel, the vehicle also having at least one undriven wheel, the control comprising:
   wheel speed sensors responsive to the driven and undriven wheels;
   means responsive to the wheel speed sensors to determine an engine drag control mode;
   means responsive to the wheel speed sensor of the undriven wheel in the engine drag control mode to derive a vehicle speed;
   means responsive to the wheel speed sensors in the engine drag control mode to derive a target velocity lower than the vehicle speed by a predetermined target velocity difference;
   means in the engine drag control mode to derive a velocity error as the difference between the driven wheel speed and the target velocity; and
   means responsive to the wheel speed sensors in the engine drag control mode to derive and deliver to the powertrain a torque command for reducing the velocity error, whereby the driven wheel speed is controlled in closed loop to the target velocity.

2. The apparatus of claim 1 in which the target velocity difference is derived as a function of the vehicle speed.

3. The apparatus of claim 2 in which the target velocity difference is reduced as a function of vehicle turn curvature.

4. The apparatus of claim 1 in which the target velocity difference is derived as a function of vehicle turn curvature.

5. The apparatus of claim 1 in which the means responsive to the wheel speed sensors to determine the engine drag control mode are also responsive to a torque delivered by the powertrain.

6. The apparatus of claim 1 having a pair of driven wheels in which the driven wheel speed used is the driven wheel speed that is closest in speed to the vehicle speed.

7. The apparatus of claim 6 further having a pair of undriven wheels in which the vehicle speed is a function of the wheel speeds of both of the undriven wheels.

8. A method of controlling torque of a powertrain in a vehicle, the powertrain driving a pair of driven wheels and the vehicle also having a pair of undriven wheels, the control comprising the steps:
   determining wheel speeds of the driven wheels and the undriven wheels;
   responsive at least to the wheel speeds of the driven wheels and the undriven wheels, determining an engine drag control mode;
   in the engine drag control mode, deriving a vehicle speed from the wheel speed of at least one of the undriven wheels;

in the engine drag control mode, deriving a target velocity lower than the vehicle speed by a predetermined target velocity difference determined at least from the vehicle speed;

in the engine drag control mode, calculating a velocity error as the difference between the wheel speed of one of the driven wheels and the target velocity; and in the engine drag control mode, deriving from the wheel speeds and delivering to the powertrain a torque command for reducing the velocity error, whereby the driven wheel speed is controlled in closed loop to the target velocity.

9. The method of claim 8 wherein, in the step of calculating a velocity error, the one of the driven wheels is the driven wheel having a wheel speed closest to the vehicle speed.

* * * * *